May 23, 1967     L. RUSSELL     3,321,737
SONAR-TYPE SENSORY AIDS
Filed Feb. 3, 1965     2 Sheets-Sheet 2
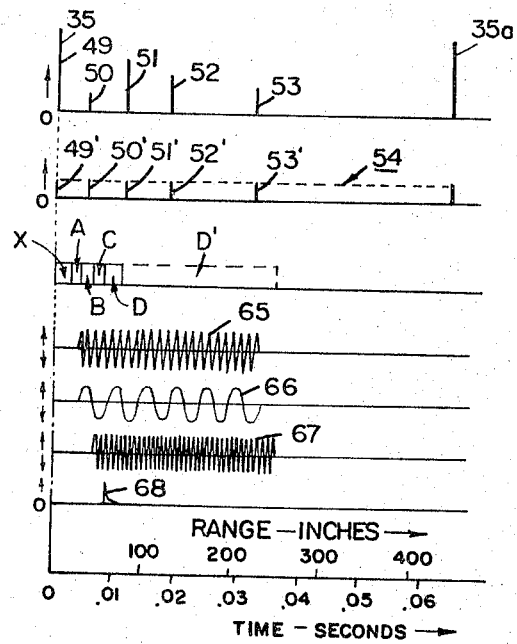
FIG. 5
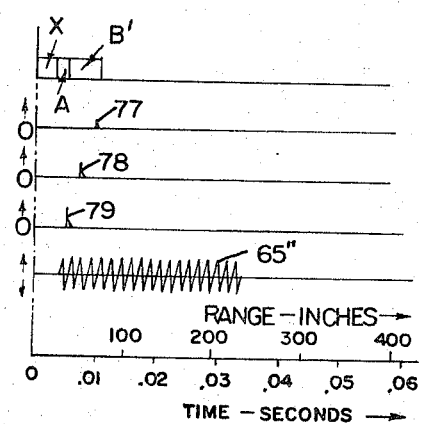
FIG. 8
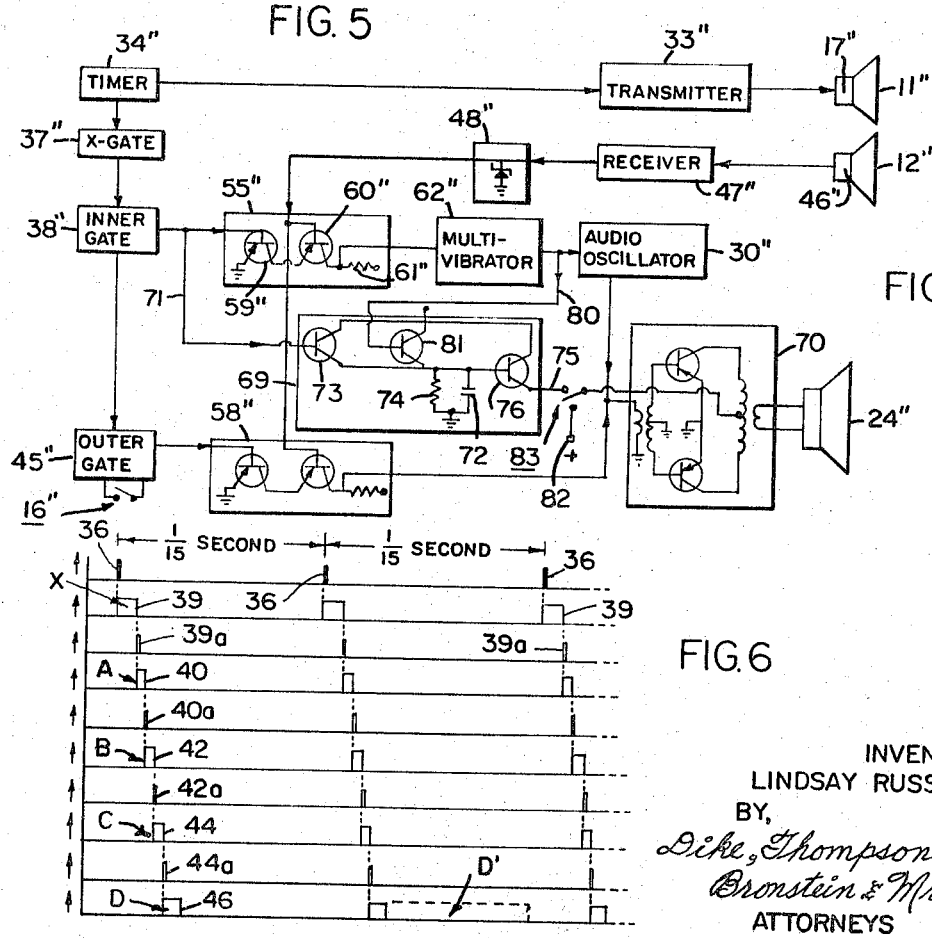
FIG. 7
FIG. 6
INVENTOR
LINDSAY RUSSELL
BY,
Dike, Thompson,
Bronstein & Mrose
ATTORNEYS United States Patent Office 3,321,737
Patented May 23, 1967

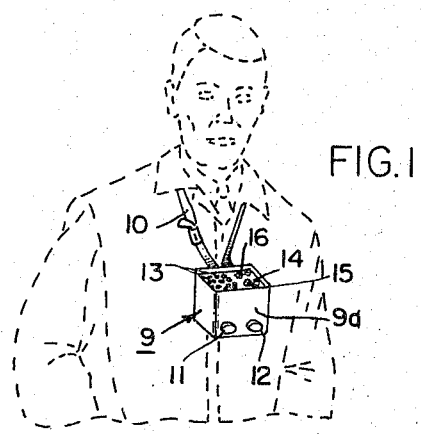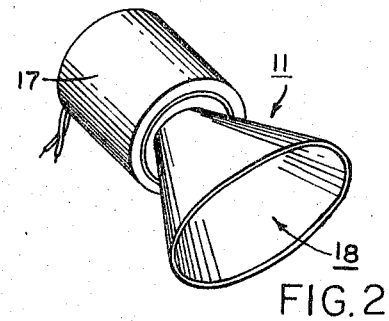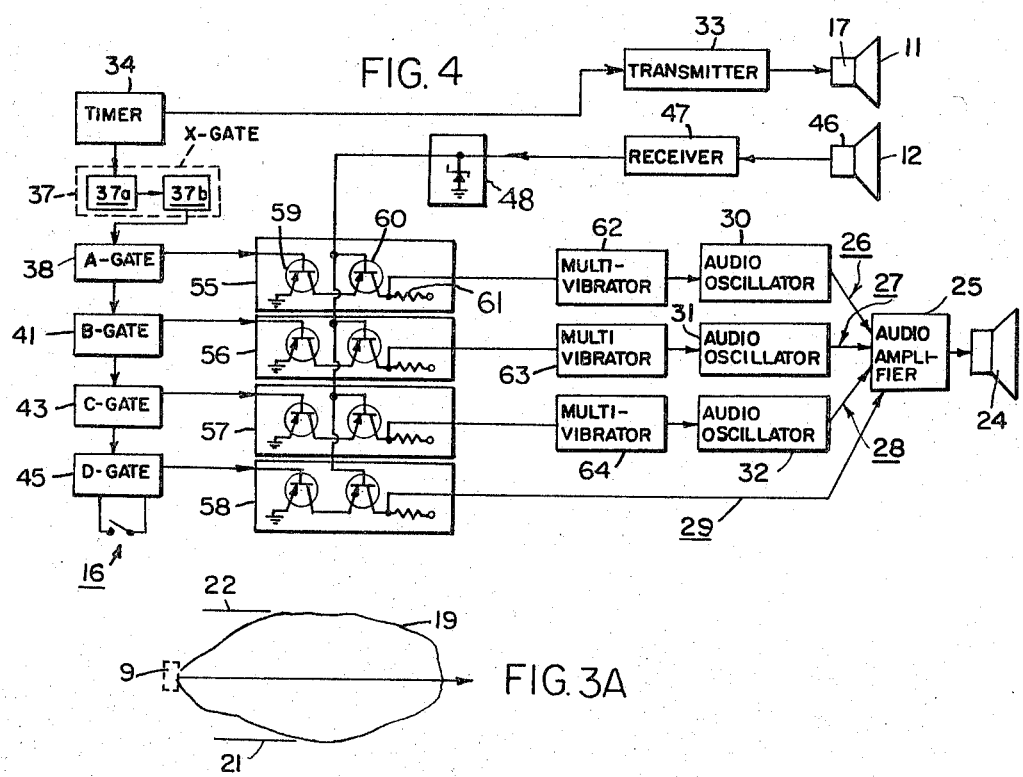

3,321,737
SONAR-TYPE SENSORY AIDS
Lindsay Russell, 100 Memorial Drive, Apt. 5-18-C,
Cambridge, Mass. 02138
Filed Feb. 3, 1965, Ser. No. 430,069
11 Claims. (Cl. 340—1)

The present invention relates to special-purpose pulse sonar apparatus which is distinctively suited to aid maneuvers of sightless persons, and, in one particular aspect, to novel and improved portable blind guidance devices wherein supersonic probing signals are uniquely processed to alert the user of his relation to obstacles reliably and with a minimum of training, conscious effort, and likelihood of confusion.

Sonar-type devices have long been considered to offer great promise in equipment serving as aids to the blind, in that they tend to operate well over limited ranges with low power, are not unduly susceptible to interference effects, and lend themselves to scannings which can characterize much of the detailed information normally collected by the eye. Despite the technical sophistication of numerous prior proposals, these have failed to satisfy the basic needs of the sightless in as simple and effective a manner as would cause them to find widespread acceptance. It has been found, for example, that such factors as the location of hardware at various positions on the blind user's body, and the need for extensive practice and training, and the demand of regular scanning motions by the user, and the requirement for constant fatiguing attentiveness to and interpretation of a proliferation of signals, are highly objectionable. In accordance with the present teachings, however, these and other undesirable factors ar eliminated, and the sightless operator is clearly and appropriately alerted only to the appearances of objects within ranges which should command either his general precautionary awareness or, alternatively, emergency action. Equipment which effects these results is compact, and easily worn and operated, and uniquely involves time-discriminated encoding of pulses and automatic selective excitation of different output signalling devices to characterize the processed information concerning locations of obstacles.

It is one of the objects of the present invention, therefore, to provide novel and improved sonar-type object-detection system wherein simple and highly intelligible output signalling characterizes only the closest position or approach of an object among numerous detected objects within different ones of a limited sequence of positional ranges.

Another object is to provide supersonic sensory apparatus which reliably detects and distinctively signals the appearance of and/or rate of approach of the nearest obstacle within only a predetermined limited range of distances and irrespective of differences in obstacle sizes.

A further object is to provide unique sonar-type devices for guidance of the blind, and the like, which readily lend themselves to highly effective use with little operator training and which resolve large quantities of detected information into more meaningful and simplified command-type output signals.

Still further, it is an object to provide novel and improved supersonic equipment which aids the guidance of sightless persons by signalling the occurrence of and rate of approach of the nearest obstacle within limited directional ranges of interest while discriminating against all other obstacles and their occurrences in other ranges, whereby, advantageously, the user effectively senses the presence and approach of the nearest obstacle of any size as a stationary or movable wall extending in a predetermined relative direction.

By way of a summary account of practice of this invention in one of its aspects, a miniature transistorized electrosonic transceiver unit, worn externally at chest height by a blind user, periodically emits a burst of supersonic pulses in the direction of his travel. Reflected pulse signals received by the same unit within predetermined intervals after transmission of the burst are discriminated as to the successive ranges of times when they are received. Unique electronic processing of these signals within the transceiver unit results in the emission of distinctive audible signals which signify to the user only the closest of predetermined distance ranges within which an obstacle is being sensed. The rate at which any such obstacle is being approached is also readily determined, and the operator is thus signalled in terms which he may immediately translate into corrective maneuvers.

Although the aspects of this invention which are believed to be novel are set forth in the appended claims, additional details as to preferred practices of the invention and as to the further objects, advantages and features thereof may be most readily comprehended through reference to the following description taken in connection with the accompanying drawings, wherein:

FIGURE 1 pictorially illustrates the improved blind guidance device oriented for signalling in relation to the body outline of a user;

FIGURE 2 depicts a supersonic transducer used for transmission and reception of pulses in the improved guidance device;

FIGURE 3A is a vertical-plane (elevation) radiation pattern for the transducer of FIGURE 2;

FIGURE 3B is a horizontal-plane (azimuth) radiation pattern for the same transducer;

FIGURE 4 provides a system diagram, partly in block and schematic forms, of one embodiment of electrical circuitry wherein teachings of this invention are practiced;

FIGURE 5 graphically represents the interrelationships between pulses, obstacle ranges, and output signals for the system of FIGURE 4;

FIGURE 6 graphically represents the triggering and gating signals which are developed in the system of FIGURE 4;

FIGURE 7 is an electrical system diagram, partly in block and schematic forms, of another preferred and simplified embodiment of the improved blind guidance apparatus; and FIGURE 8 graphically represents the interrelationships between pulses, obstacle ranges, and output signals for the system of FIGURE 7.

The self-contained portable blind guidance apparatus 9, in FIGURE 1, is shown to be worn at chest height upon the person of a sightless operator, by means of a neck strap 10. At the front 9a two miniature horns, 11 and 12, associated with separate supersonic transducers, are aimed in the direction of travel and are used, respectively, to directionally radiate and receive reflections of short bursts of supersonic pulses which are generated periodically within the device. The reflections from objects encountered in the paths of travel are amplified and processed by encoding circuitry which distinctively actuates a miniature loudspeaker to emit different types of audible signals from the grill-like openings 13 at the top of the device. Reflected pulses picked up by the transducer 12 within a first short predetermined interval after transmission characterize the hazardous location of an object within a first small predetermined range of distances in front of the user. Detection of such pulses is translated into a clear audible warning signal which cannot be ignored. Pulses picked up during successive predetermined intervals after transmission characterize the occurrence of obstacles at successively greater distances, and are translated into less-disturbing but noticeable audible signals which are distinctive for each range and can be conveniently monitored by the user without requiring constant conscious attention and without materially interfering with his hearing of other ambient sounds. A typical set of remarkably simple controls for the unit includes merely an on-off switch 14, a volume-regulating switch 15, and a range-extending switch 16. Objects may readily be detected at distances up to about thirty feet, or more, although the electronic processing circuitry is intentionally operated in a manner which prevents the output signalling of the presence of objects beyond such a range, even though they are detected; this provision reduces the tendencies of audible signalling to confuse or disturb the user needlessly. Size and shape of the unit are about the same as those of a portable camera; the unit is thus inconspicuous, and moreover, advantageously leaves the user's hands free.

It is desirable that a highly directionalized search pattern be developed, to promote a discrimination between obstacles in the path of travel and elsewhere; for these purposes, the two transducers, which may be of a known electrically-actuated vibrating disk form, are each equipped with a small flattened horn (11 and 12, respectively). Transmitting transducer 17 and the associated horn 11 are shown in an enlargement in FIGURE 2, with the somewhat elliptical horn opening 18 being flattened in the vertical direction and extending forwardly of the user when in operation; the receiving transducer is substantially the same. In an alternative construction, the transmitting and receiving functions may be served by the same transducer, although that is not currently preferred. The supersonic waves propagated from the mouth of the transducer itself tend to be axisymmetric and to produce field patterns broader than the patterns 19 and 20 represented in FIGURES 3A and 3B; however, the greater horn sound-radiating aperture in the horizontal direction, and the lesser aperture in the vertical direction, shape the field patterns to the illustrated preferred forms. The vertical-plane (elevation) field pattern 19 is made relatively broad, such that objects may be well discriminated within a height range from about the waist level 21 of the user to a level 22 somewhat above the head. This advantageously circumvents system responses to the surfaces being trod, which would otherwise be constantly signalled and prevent effectiveness beyond a close short range; where the terrain is unfamiliar, a cane is employed to supplement the system and establish the character of the ground-level surfaces. The narrower horizontal-plane (azimuth) field pattern 20 is of a width 23 not appreciably greater than the user, such that objects alongside which will not impair safe travel will not unnecessarily cause the guidance unit to emit audible output signals. Experience has established that still wider azimuth patterns can evoke disturbing false-alarm signals.

An important aspect of the improved guidance apparatus concerns the character of the audible output signalling. Outputs from the top-mounted speaker are only inches removed from the user's ears, and low volumes which are acceptable to him will be scarcely noticeable to passersby and will avoid attracting attention; at the same time, it is not necessary that the sightless person be equipped with bothersome earphones, which would also screen out the surrounding sounds to which his auditory senses are generally keenly attuned. Even more significantly, the output signals are always at full volumes, and are not of a linear-readout type which would be faint for small objects and loud for the larger objects producing greater reflections. The latter type of system is highly objectionable in that the more intense sounds would tend to overpower the feebler ones, although the more serious hazard may in fact be signalled by the fainter sounds, and in that the user must continuously strain his hearing to avoid missing the weak signals. By way of distinction, the loudspeaker 24 (FIGURE 4) is automatically selectively excited, through an audio amplifier 25, by only one of the different signals from different ones of several audio-frequency channels represented by couplings 26–29, at any time when output signalling is required; such signalling is at the predetermined volume levels established by the fixed signal levels appearing within these channels, and does not vary automatically. In the first three channels, 26–28, audio oscillators 30–32, respectively, are relied upon to generate distinctively different signalling tones, and in the fourth, 29, a simple click pulse emanating from the preceding circuitry is employed to develop an output signal. As is discussed later herein, there can be advantageous exploitation of varying-amplitude output signals, for the highly desirable purpose of indicating the rate at which an obstacle is being approached within a predetermined range, but this is to be distinguished from the aforementioned type of arrangement wherein objects of different size produce different volume levels of output which can confuse the user.

Short bursts or pulses of supersonic signals (such as 40 kc. signals) are radiated by the transmitting transducer 17 periodically (at the regular rate of 15 bursts per second, for example) in response to the keying of a known form of supersonic transmitter 33 by a timer 34, which may comprise a simple relaxation oscillator. For the representative values given, the transmitter 33 will operate at 40 kc. and the timer 34 produces 15 short keying pulses per second. In FIGURE 5, the successive pulses 35 and 35a represent the 40 kc. bursts, and the occurrences of keying pulses 36 (FIGURE 6) are of course similar. The timer pulses 36 are also simultaneously applied to a known form of monostable (i.e. "one shot") multivibrator 37a, which is part of an X-gate 37; this gate serves to trigger a succeeding A-gate, 38, which comprises a like multivibrator, after a predetermined very brief interval, X, in FIGURE 5, following transmission of each of the pulses. The same period, X, is shown in FIGURE 6 as that of each pulse 39 generated by the X-gate in response to each of the pulses 36; this same gate 37 also includes a common form of differentiator and inverter 37b forming the trigger pulse 39a from the trailing edge of the X-gate pulse. The latter pulse in turn triggers the A-gate 38, which produces the gating pulse 40 of duration A (FIGURES 5 and 6), as well as further trigger pulse 40a after the delay A. Pulse 40a triggers the B-gate 41, to produce gate pulse 42 and a trigger pulse 42a after a delay B. Pulse 42a then triggers C-gate 43, to produce gate pulse 44 and a trigger pulse 44a after a delay C. Pulse 44a, then triggers D-gate 45, to produce a gate pulse 46 of duration D. Switch 16, which is used to switch different impedances controlling gate pulse-durations in the multivibrator D-gate 45, may be manually set to extend the duration of the gating pulse from gate 45 to D' (shown in dashed linework in FIGURES 5 and 6).

Reflected pulses or echoes reaching the receiver transducer 46 via the horn 12 are amplified and detected in conventional circuitry forming the receiver 47, the latter being selectively tuned to respond to signals of the same frequency (ex. 40 kc.) as those which are transmitted. Limiter 48, shown as a known semiconductor (zener diode) form of limiter, causes the detected and amplified signals, 49–53 (FIGURE 5) to be clipped to a predetermined amplitude level 54. The clipped pulses 49'–53' are fed to the four coincidence detectors 55–58, which are also respectively fed by the output gate signals 40, 42, 44 and 46, from the A–D gates 38, 41, 43 and 45. Taking detector 55 as the example, each coincidence detector includes two transistors, 59 and 60, in series with a resistor 61. Current will flow through this series circuit only when both transistors are forward-biased; this condition occurs only when a received pulse (from among the pulses 50–53) arrives at the transistor 60 during the active condition of the associated gate (in this example, A-gate 38 and thereby causes the gating signal (40) to forward-bias the transistor 59. A positive pulse then appears across resistor 61, and this pulse causes the associated multivibrator (62) to trigger the associated audio oscillator (30) to an "on" state for a predetermined brief period. Multivibrator 62, and the corresponding units 63 and 64 for channels 27 and 28, each comprise a known form of monostable multivibrator, and these excite the respective conventional types of audio oscillators 30–32, respectively, by supplying them with voltage needed to sustain oscillations. Each audio oscillator produces a distinctive tone, of preset duration and amplitude. For clear warning purposes, the audio oscillator 30 is adjusted to develop the major attention-getting signal, 65 (FIGURE 5) preferably in the form of a piercing "beep"; this is repeated periodically (example: 15 times a second) when an object, represented by an echo pulse, falls within the time zone A (i.e., represents an obstacle within the hazard range of 20–30 inches from the user). Obstacles in the second range of 30–40 inches away, as represented by echo pulse 50 in time zone B, result in excitation of audio oscillator 31 to produce a less dominating "buzz" signal 66, and obstacles in the third range of 40–50 inches, in time zone C, cause oscillator 32 to develop a yet fainter high-frequency "chirp" 67. For the fourth and outermost range, D (representing 50–70 inches), no oscillator is used, and, instead, the gated echo pulses are passed directly to the audio amplifier 25 to cause simple low-level "clicks" 68 to be produced by the loudspeaker 24. X-gate 37 is used to delay very briefly the initial actuation of A-gate 38, which would otherwise cause false actuations of oscillator 30 each time the transmitted pulse or burst 35 is released; this feature is needed because, as a practical matter, it is difficult to prevent the receiver horn 12 from picking up the pulses 35, as they are transmitted, with the latter being then processed as apparent echoes from nearby objects. The patterns of sounds for the various ranges may be changed, as desired, to suit the preferences of the user.

A less-complicated and yet highly satisfactory modification of the system appears in FIGURE 7, wherein the portions which are functional equivalents of those shown in FIGURE 4 have the same reference characters ascribed to them, with distinguishing double-prime accents being added. The so-called "inner gate," 38″, is the same as the A-gate in FIGURE 4, and causes a clear warning signal 65″ (FIGURE 8) to be developed by the loudspeaker 24″ if any object is detected in the first close range between 20 and 30 inches ahead of the device. So-called "outer gate" 45″ is similar to the D-gate in FIGURE 4, except that its gating period is of a longer duration, B′ (FIGURE 8), corresponding to the 30–70 inch range, for example. The user witnesses either "clicks" or a more penetrating intermittent (15 times per second) "beep" signal as obstructions are encountered first at a greater, and then at a lesser, distance. The sensations experienced are advantageously similar to those of a sighted person encountering successive "walls" at these distances, and complex interpolations and a high degree of concentration are not required.

The system in FIGURE 7 includes additional loudness-sequence circuitry, 69, the result of which is to cause the "clicks" representing the more remote obstacles to be louder or softer depending, respectively, upon whether an obstacle is nearer or further from the 30-inch inner limit of the outer range. This control of loudness is effected by controlling the collector supply voltage of the audio amplifier stage 70, which is shown as a transistorized push-pull Class B amplifier. Inasmuch as the echoes from more distant objects arrive later than those from closer ones, the desired changes in volume are derived from signals which decay, with time, from a maximum level established at the moment when inner gate 38″ has ceased delivery of its gating pulse to coincidence detector 55″. For this purpose, the A gating pulse (40, in FIGURE 6) is applied over coupling 71 to a capacitor 72 in loudness control circuitry 69, via an emitter-follower isolation stage 73. When that capacitor has been fully charged, and the A gating pulse ceases, capacitor discharge commences through resistance 74, and the voltage level communicated to the push-pull transistor collectors over coupling 75 from isolation amplifier 76 drops correspondingly. Isolation is necessary to prevent an excessively low-resistance discharge path from being witnessed by the capacitor. Click signals from coincidence detector 58″ are of virtually the same amplitude, because of the effects of limiter 48″, and are of amplitude sufficient to saturate the Class B output stage 70; hence, the output of the latter stage tends to be approximately proportional to the collector-supply voltage appearing in coupling 75. A voltage drop to about 40% of maximum is adequate to produce distinctly different amplitude levels of clicks, such as the click output signals 77–79 (FIGURE 8) corresponding to echoes from obstacles at distances of about 68, 50 and 32 inches, respectively.

The time-variable voltage should not interfere with the long-period "beep" signals 65″ characterizing a close inner-zone obstacle, and, for that reason, the collector-supply voltage of output stage 70 should remain at its maximum level throughout the duration of each periodic warning "beep." This is accomplished by connecting the output of keying multivibrator 62″ in a charging relationship to capacitor 72 via coupling 80 and an isolation amplifier 81. Capacitor 72 thus remains fully charged until each "beep" signal 65″ is completed, and the audible output likewise remains at full volume. Isolation amplifiers 73 and 81 prevent unwanted interactions between multivibrators 38″ and 62″. Importantly, the variable loudness feature is independent of obstacle sizes, and it assists the blind operator in judging very quickly and easily the rates at which he approaches obstacles. It is especially helpful when the total range is short; for the longer ranges, this feature may be inactivated by exciting the output stage collectors from a constant-voltage tap 82, by manipulating switch 83.

It should be understood that the specific embodiments and practices described and portrayed have been presented by way of disclosure, rather than limitation, and that various modifications, adaptations, substitutions and combinations may be effected by those skilled in the art without departure from the spirit and scope of this invention in its broader aspects.

What I claim as new and desire to secure by Letters Patent of the United States is:

1. Object-sensing apparatus for guidance of a blind person comprising a miniature casing, means for mounting said casing upon the chest of a blind person, and apparatus mounted within said casing including means for transmitting periodic relatively short bursts of supersonic signals, receiver means producing an electrical pulse responsive to each reflection of said supersonic signals from an object, at least two gating means each responsive to triggering signals to produce electrical gating pulses of predetermined duration greater than the duration of said bursts of supersonic signals and at least the first thereof further producing an electrical triggering pulse at the end of each gating pulse thereof, means applying the triggering pulses from at least the first of said gating means to a second one of said gating means as triggering signals therefor, means applying triggering signals to the first of said gating means at the end of each of said bursts of supersonic signals, at least two coincidence detectors each producing a coincidence signal when inputs thereto coincide, means applying the electrical pulses from said receiver means and the gating pulses from a different one of said gating means to different ones of said coincidence detectors as inputs therefor, and at least two means each responsive to a different one of said coincidence signals for producing distictive audible output signals, whereby each of said audible output signals characterizes the presence of an object within a predetermined different range of distances ahead of the blind person.

2. Object-sensing apparatus for guidance of a blind person as set forth in claim 1 wherein each of said gating means comprises a monostable multivibrator producing said gating pulses of durations corresponding to times for said bursts of supersonic signals to reach and be reflected from objects within predetermined ranges of distances ahead of the blind person, and wherein at least the first of said gating means further includes differentiator means producing said triggering pulses responsive to the trailing edges of the gating pulses thereof.

3. Object-sensing apparatus for guidance of a blind person as set forth in claim 1 wherein at least one of said means for producing said distinctive audible output signals comprises a monostable multivibrator responsive to said coincidence signals, and an audio frequency oscillator exciting a loudspeaker and switched between "on" and "off" states by said monostable multivibrator.

4. Object-sensing apparatus for guidance of a blind person as set forth in claim 3 wherein said first of said gating means produces gating pulses which are closest in time to said bursts of supersonic signals, and wherein the audio frequency oscillator responsive to said first of said gating means produces an audio frequency signal of frequency and amplitude to command the attention of the blind person to a greater extent than any other of said means for producing audible output signals.

5. Objecting-sensing apparatus for guidance of a blind person as set forth in claim 4 wherein the second of said gating means is responsive to the triggering pulses of said first of said gating means, and wherein the coincidence detector supplied with an input from said second of said gating means applies electrical pulses from said receiver means to said output signal producing means for producing an audible output related thereto from said loudspeaker.

6. Objecting-sensing apparatus for guidance of a blind person as set forth in claim 5 further comprising means regulating the volume of said audible outputs which are responsive to said pulses from said receiver means in accordance with the times at which they occur within the intervals of said gating pulses from said second gating means.

7. Objecting-sensing apparatus as set forth in claim 6 wherein said means regulating said volume includes a capacitor, means for charging said capacitor with said gating pulses from said first gating means, means providing a discharge path for said capacitor, and means responsive to the voltages across said capacitor controlling the amplitudes of audio output signals produced by said audible output signal producing means.

8. Objecting-sensing apparatus comprising means for transmitting periodic relatively short bursts of supersonic signals, receiver means producing an electrical pulse responsive to each received reflection of said supersonic signals from an object, said transmitting means and receiver means being at substantially the same site and including directionalized supersonic transducer means propagating the transmitted bursts of signals from said transmitting means and receiving each reflection of said signals within predetermined narrow directional limits, said transmitting means including means regulating the transmissions of said bursts of signals at a repetition rate of many times per second, at least two gating means each responsive to triggering signals to produce electrical gating pulses of predetermined duration greater than the duration of said bursts of supersonic signals and at least the first thereof further producing an electrical triggering pulse at the end of each gating pulse thereof, means applying the triggering pulses from at least the first of said gating means to a second one of said gating means as triggering signals therefor, means applying triggering signals to the first of said gating means at the end of each of said bursts of supersonic signals, at least two coincidence detectors each producing a coincidence signal when inputs thereto coincide, means applying the electrical pulses from said receiver means and the gating pulses from a different one of said gating means to different ones of said coincidence detectors as inputs therefor, and at least two means each responsive to a different one of said coincidence signals for producing distinctive output signals, at least one of said means for producing said distinctive output signals comprising a monostable multivibrator responsive to said coincidence signals and an output signalling means switched between "on" and "off" states by said monostable multivibrator, said output signalling means comprising means for producing an audible output signal, an audio oscillator, and means exciting said means for producing an audible output signal with the output from said audio oscillator, said triggering signals, gating pulses, triggering pulses, and output signals occurring during the intervals between succesive bursts of said supersonic signals, whereby each of said output signals characterizes the presence of an object within a predetermined different range of distances from said transmitting means.

9. Object-sensing apparatus as set forth in claim 8 wherein said first of said gating means produces gating pulses which are closest in time to said bursts of supersonic signals, and including an audio oscillator producing an audio frequency signal of frequency and amplitude which command attention of a listener to a greater extent than any of the other output signalling means of the apparatus, and means exciting said last-named audio oscillator responsive to the monostable multivibrator and output signalling means responsive to the coincidence detector associated with said first of said gating means.

10. Object-sensing apparatus as set forth in claim 9 including means connecting the second of said gating means for response to the triggering pulses of said first gating means, and means connecting the coincidence detector supplied with an input from said second gating means to apply electrical pulses from said receiver means to said output signal producing means for producing an audible output related thereto.

11. The method of sensing objects for guidance of a blind person comprising the steps of producing bursts of supersonic signals at a repetition rate of many times per second and propagating said bursts in a directional beam substantially horizontally and forwardly from in front of a blind person at about chest height, receiving the supersonic signals reflected from objects within the beam and producing electrical pulses related thereto, producing a first audible alarm signal for a period less than the remaining interval before transmission of the next-succeeding burst of supersonic signals whenever an electrical pulse is produced within a first predetermined relatively sustained interval following transmission of a burst of the supersonic signals, and producing at least a second distinctive audible output signal for a period less than the remaining interval before transmission of the next-succeeding burst of supersonic signals whenever an electrical pulse is produced within at least a second predetermined relatively sustained interval following said first predetermined interval and before transmission of the next-succeeding burst of supersonic signals.

References Cited by the Examiner

UNITED STATES PATENTS

| | | | |
|---|---|---|---|
| 2,500,638 | 3/1950 | Krauth | 340—16 |
| 2,541,944 | 2/1951 | Slaymaker et al. | 340—16 X |
| 2,560,587 | 7/1951 | Miller | 340—16 |
| 2,998,591 | 8/1961 | Lovett | 340—1 |
| 3,087,151 | 4/1963 | Vantine | 343—13 X |
| 3,125,754 | 3/1964 | Reumerman et al. | 340—1 X |

FOREIGN PATENTS 1,296,625   5/1962   France.

OTHER REFERENCES

Witchel et al.: "Echo Location For the Blind," Electronics, December 1944, pp. 136 and 137.

CHESTER L. JUSTUS, *Primary Examiner*.

RODNEY D. BENNETT, *Examiner*.

R. A. FARLEY, *Assistant Examiner*.